(12) United States Patent
Walch et al.

(10) Patent No.: US 11,021,191 B2
(45) Date of Patent: Jun. 1, 2021

(54) STRUCTURAL COMPONENT FOR A MOTOR VEHICLE BODY

(71) Applicant: Muhr und Bender KG, Attendorn (DE)

(72) Inventors: Johannes Walch, Neufahrn bei Freising (DE); Michael Stein, Röhrmoos (DE); Hubertus Steffens, Drolshagen (DE)

(73) Assignee: Muhr und Bender KG, Attendorn (DE)

(*) Notice: Subject to any disclaimer, the term of this patent is extended or adjusted under 35 U.S.C. 154(b) by 113 days.

(21) Appl. No.: 16/334,083

(22) PCT Filed: Sep. 25, 2017

(86) PCT No.: PCT/EP2017/074252
§ 371 (c)(1),
(2) Date: Mar. 18, 2019

(87) PCT Pub. No.: WO2018/060143
PCT Pub. Date: Apr. 5, 2018

(65) Prior Publication Data
US 2019/0233019 A1 Aug. 1, 2019

(30) Foreign Application Priority Data
Sep. 28, 2016 (DE) ...................... 10 2016 118 366.0

(51) Int. Cl.
*B62D 25/04* (2006.01)
*B62D 21/15* (2006.01)

(52) U.S. Cl.
CPC ........... *B62D 25/04* (2013.01); *B62D 21/157* (2013.01)

(58) Field of Classification Search
CPC .............................. B62D 21/157; B62D 25/04
(Continued)

(56) References Cited

U.S. PATENT DOCUMENTS

| 8,491,047 B1* | 7/2013 | Moll ...................... B62D 25/04 296/193.06 |
| 2016/0257348 A1* | 9/2016 | Balur ..................... B62D 27/02 |
| 2017/0073017 A1* | 3/2017 | Steffens ............... B62D 29/005 |

FOREIGN PATENT DOCUMENTS

| DE | 197 35 640 A1 | 2/1999 |
| DE | 10 2013 114 108 A1 | 6/2015 |

(Continued)

OTHER PUBLICATIONS

International Search Report and Written Opinion for PCT/EP2017/074252 dated Jan. 31, 2018 (13 pages; with English translation).

*Primary Examiner* — Joseph D. Pape
*Assistant Examiner* — Dana D Ivey
(74) *Attorney, Agent, or Firm* — Bejin Bieneman PLC

(57) ABSTRACT

A structural component for a motor vehicle body comprises: an outer panel with an outer wall and two outer flange portions; an inner panel with an inner wall and two inner flange portions; a reinforcing profile with a profile base, two profile walls opposite one another and two connecting portions connected thereto; wherein, in an upper pillar section, a maximum profile height of the reinforcing profile is greater than a maximum profile height of the outer panel, wherein the connecting portions of the reinforcing profile are supported against the inner wall, and wherein the connecting portions of the reinforcing profile are supported against the inner wall, and wherein the outer flange portions and the inner flange portions directly abut one another and are fixed to one another, wherein the connecting portions of the reinforcing profile are fixed, at least in a lower section of the structural component, between the outer flange portions and the inner flange portions.

17 Claims, 2 Drawing Sheets

(58) Field of Classification Search
USPC .................................................. 296/193.06
See application file for complete search history.

(56) References Cited

FOREIGN PATENT DOCUMENTS

| | | |
|---|---|---|
| DE | 10 2013 011 679 B4 | 1/2016 |
| EP | 2 985 209 A2 | 2/2016 |
| JP | 2001310762 A | 11/2001 |
| WO | 2015/071412 A1 | 5/2015 |
| WO | 2015/107227 A2 | 7/2015 |
| WO | 2015/146903 A1 | 10/2015 |

* cited by examiner

STRUCTURAL COMPONENT FOR A MOTOR VEHICLE BODY

CROSS-REFERENCE TO RELATED APPLICATIONS

This application is a national stage of, and claims priority to, Patent Cooperation Treaty Application No. PCT/EP2017/074252, filed on Sep. 25, 2017, which application claims priority to German Application No. DE10,2016/118366.0, filed on Sep. 28, 2016, which applications are hereby incorporated herein by reference in their entireties.

BACKGROUND

From U.S. Pat. No. 8,491,047 B1 a B-pillar for a motor vehicle body is known. The B-pillar comprises an inner formed part, a hat-shaped support element connected thereto and an outer formed part. The inner formed part and the outer formed part have lateral flange portions which are connected to each other. The support member is welded with its flange portions to an inner surface of the inner formed part and extends towards the outer formed part, wherein a gap is formed between the bottom portion of the support member and the outer formed part.

A B-pillar with a similar structure is known from DE10,2013/114108 A1. A hat-shaped reinforcing section is provided between the inner and outer pillar parts, the flange portions of which are connected to the inner pillar part by a structural foam and the bottom portion of which is connected to the outer pillar part by a structural foam.

DE19735640 A1 refers to a motor vehicle B or C pillar that serves to fasten a safety belt and comprises an outer panel, an inner panel and a reinforcing panel arranged between the inner panel and the outer panel. The reinforcing panel has two bent legs which rest against the inner panel and are welded to it.

A structural component in the form of a B-pillar for a motor vehicle body is known from EP2,985,209 A2. The B-pillar comprises a cold-formed inner formed part and a hot-formed and hardened outer formed part having a variable thickness along its length and a connecting edge for connection to the first formed part. The inner formed part and the outer formed part are joined together by a high-energy beam weld along the joint edge, wherein the joint edge of the outer formed part is spaced from an outer edge of the inner formed part so that the inner formed part here forms a single-layer flange portion of the B-pillar for attachment to a body member.

From DE10,2013/011679 B4 a B-pillar with an inner panel with two lateral flanges, a hat-shaped outer panel with two lateral flanges and a hat-shaped reinforcing panel with two lateral flanges arranged therebetween is known. The flanges of the inner panel, the reinforcing panel and the outer panel are joined and welded together to form a total three-layer flange of the B-pillar.

Reinforcement components, in particular B-pillar reinforcements, are generally designed as hat profiles. The joining flanges of the reinforcing components, respectively of the B-pillar, simultaneously form the door flange on which the edge protector and/or door seal is mounted during subsequent vehicle assembly. This means that the door flange is more on the inside of the vehicle with respect to the construction depth of the B-pillar. In vehicles with frameless doors, the joining flange of the B-pillar shifts from about the height of the upper door hinge towards the outside of the vehicle to form a sealing plane with the door window.

The geometry of a reinforcement component of a B-pillar significantly influences the load that the B-pillar can bear. It generally applies that a B-pillar with a larger construction depth has greater bending stiffness than a B-pillar with a smaller construction depth.

SUMMARY

Presently disclosed is a reinforcement arrangement for a motor vehicle body, in particular a B-pillar reinforcement, which has a high bending stiffness with the lowest possible construction depth. The present disclosure refers to a structural component, in particular for a motor vehicle body, comprising a cold-formed first formed part and a hot-formed and hardened second formed part having a connecting portion for connecting to the first formed part, and a method of producing such a structural component.

A structural component for a motor vehicle body, in particular in the form of a B-pillar, comprises: an outer panel having an outer wall, two opposing side walls and two outer flange portions projecting laterally therefrom; an inner panel having an inner wall, two opposing side walls and two inner flange portions projecting laterally therefrom; a reinforcing profile having a profile bottom, two opposing profile walls and two connecting portions connected thereto; wherein it is provided that, at least in an upper section of the structural component, a maximum profile height of the reinforcing profile is greater than a maximum profile height of the outer panel, the connecting portions of the reinforcing profile are supported against the inner wall of the inner panel, and the outer flange portions of the outer panel and the inner flange portions of the inner panel are directly abutting each other and fixed to each other. In particular, it may be provided that the connecting portions of the reinforcing profile, at least in a lower section of the structural component, are fixed between the outer flange portions of the outer panel and the inner flange portions of the inner panel.

An advantage is that the effective profile height of the reinforcing profile, which has a significant influence on the bending stiffness of the structural component, is increased at least in the upper section of the structural component. In this way, for example, a higher bending stiffness of the reinforcing profile and thus of the structural component can be achieved with an equal profile height of the structural component and/or an equal sheet thickness of the reinforcing profile, wherein the profile height of the structural component and/or the sheet thickness of the reinforcing profile can be reduced with an equal bending stiffness of the structural component. By the presently described structure, additional reinforcing components can be dispensed with under certain circumstances due to the achievable higher bending stiffness of the structural component, which in turn reduces the manufacturing and assembly costs for the structural component. In addition, the achievable lower profile height of the structural component and/or the achievable lower sheet thickness of the reinforcing profile can save weight.

The structural component may in particular be designed in the form of a vehicle pillar of a motor vehicle, e.g., an A, B, or C pillar. The inner panel, also designated as closing panel, pillar inner, inner sheet metal, or inner formed part, thus forms part of the inside of a vehicle body. The outer panel, which is also referred to as the outer formed part, pillar outer or outer sheet metal, forms part of the outside of the vehicle body. The vehicle pillars are usually connected to an outer skin, which represents the body panel visible from the outside.

A B-pillar, also known as a central pillar, can be functionally divided into several sections, e.g., a head section for connecting the B-pillar to a roof rail, an upper pillar section extending downwards from the head section, a lower pillar section extending further downwards and an adjoining foot section configured to connect the B-pillar to a sill.

It is disclosed herein in particular that the structural design, according to which the maximum profile height of the reinforcing profile is greater than the maximum profile height of the outer panel, extends over at least 0.3 times the total height of the B-pillar, e.g., at least 0.4 times the total height, e.g., at least 0.5 times the total height. It is also possible that this design is realized over an even larger extension, e.g., also over the entire length of the reinforcement profile. Consequently, the above mentioned advantages of an increased bending stiffness and/or of a reduced weight apply accordingly also in this pillar region over the respective extension.

It may be provided in at least a portion of the upper pillar section, e.g., in the entire upper pillar section, that the maximum profile height of the reinforcing profile is greater than 0.9 times the smallest distance between the outer wall and the inner wall. This design structure with a largest possible profile height of the reinforcing profile can be continued up to the middle or lower pillar section, with the associated advantage of increased bending stiffness over the respective extension.

The connecting portions of the reinforcing profile are supported against the inner wall of the inner formed part at least in a portion of the upper pillar section. It is to be understood that this structural design with a reinforcing profile supported on the inner wall can also be realised so as to further extend downwardly to the middle or lower pillar section. Consequently, the above mentioned advantages of an increased bending stiffness respectively a reduced weight are also achieved accordingly in this pillar section over the respective extension.

The connecting portions of the reinforcing profile preferably lie flat against the inner wall of the inner panel. This results in good force transmission, i.e., support of the reinforcing profile against the inner panel. The connecting portions are bent-off flange-like from the side walls and supported against the inner wall, respectively connected thereto. Thus, the connecting portions can also be referred to as flange or support portions.

The connecting portions are fixed to the inner wall of the inner panel at least in the head section of the B-pillar. The connection can be achieved in a material-locking manner, e.g., by welding or gluing, and/or in a form-locking manner, e.g., by riveting. In the further downward direction, i.e., in the upper pillar section adjoining the head section, the connecting portions can also be fixed to the inner wall of the inner formed part. Alternatively, it is also possible that the connecting portions are supported on the inner wall of the inner formed part without being fixed in at least a portion of the upper pillar section. This means that the reinforcement profile would only be supported against the inner wall, but not attached thereto by special fixing means, such as a weld. The fixed connection of the reinforcing profile with the inner panel would in this case be realised via the upper attachment in the head section and the lower attachment in the lower pillar section.

The flange portions of the outer panel and the flange portions of the inner panel are directly fixed to one another, e.g., in a material-locking manner by welding, at least in a portion of the upper pillar section, e.g., in the entire upper pillar section. In this section, the B-pillar thus has a two-layer flange on both sides, which serves in particular as a door flange. A two-layer flange has the advantage of better weldability with an outer skin of the vehicle than a comparatively thicker three-layer flange.

Viewed in cross-section, the inner wall of the inner panel can have two lateral recesses which are arranged adjacent to the inner side wall portions and extend parallel thereto. The recesses can, for example, be provided in a central section of the B-pillar, wherein it is understood that the recesses can also extend into the upper and/or lower pillar section. It is provided in particular that, if viewed in cross-section, at least one of the connecting portions of the reinforcing profile is supported in one of the lateral recesses. The extension of the reinforcing profile into the recess also contributes to a large profile height and thus increased bending stiffness.

According to a possible embodiment it is provided at least in a lower pillar section that the connecting portions of the reinforcing profile are fixed between the outer flange portions of the outer panel and the inner flange portions of the inner panel. In this way, a three-layer flange is formed on both sides of the B-pillar in the lower pillar section, which serves in particular as a door flange. The fixing of the three flange layers, i.e., flange portion of the outer panel, connecting portion of the reinforcing profile and flange portion of the inner panel, is carried out in particular by means of welding, for example, resistance spot welding or high-energy beam welding. The structural design that the connecting portions of the reinforcement profile are fixed between the flange portions of the outer and inner panel can be selected over an extension of less than 0.5 times the total height of the B-pillar. In the context of this disclosure, the lower pillar section may in particular be regarded as a section which substantially has an overlap with the motor vehicle door. The upper section of the pillar may include in particular a section which is substantially in the area of a side window. A central pillar section, which may be located between the upper and lower pillar section, may be in particular located substantially at the level of the vehicle's shoulder line.

According to a preferred embodiment, the reinforcing profile is designed such that at least one of the profile walls, in at least one cross-section through the structural component, encloses an angle with a plane perpendicular to the base, which angle is smaller than 5°, e.g., smaller than 3°, e.g., smaller than 2°. This design ensures that the profile walls are relatively steep in relation to the inner wall, from which they extend towards the outer wall. As a result, the profile base is as wide as possible so that it can absorb high compressive forces.

Preferably the connecting portions of the reinforcing profile have a width of less than 20 mm, e.g., less than 16 mm. The edges, i.e. lateral ends of the connecting portions are arranged as close as possible to the side walls of the inner panel. Together with the smallest possible width of the connecting portions, this design also contributes to the widest possible reinforcement profile.

At least in a portion of the upper pillar section, in particular at least in the entire upper pillar section, an average width between the side walls of the reinforcing profile can be greater than 0.3 times and/or less than 0.7 times an average width between the side walls of the inner panel. This is to ensure that the bottom portion of the reinforcement profile is as wide as possible and thus has a high resistance to buckling.

According a possible configuration, the inner panel and/or the outer panel may be a cold-formed component made of a metallic material, preferably steel sheet. Cold forming is understood as the forming of metals at a temperature well below their recrystallization temperature. For example, a cold-rolled, micro-alloyed steel sheet can be used as a steel material. The steel sheet can be provided with a corrosion protection coating, e.g., a zinc coating.

The reinforcement profile is preferably a hot formed and hardened component made of a metallic material. In the context of this disclosure, hot forming is understood in particular to mean the forming of metals above their recrystallisation temperature. Any hardenable steel, e.g., a boron steel such as 22MnB5, can be used as the steel material for the reinforcing profile. The reinforcing profile can be coated, e.g., with an aluminium-silicon alloy or zinc, to avoid scaling of the component during hot forming and/or to serve as corrosion protection. The reinforcement profile is hardened either after hot forming or in the context of hot forming at least in partial areas, preferably completely. Hot forming and hardening can be carried out in one process in a press hardening tool. This combined forming and hardening process is also known as press hardening.

According to a possible embodiment, at least one of the components, reinforcement profile, inner panel and/or outer panel, can have a variable thickness over its length. A component with variable thickness over its length can be produced, for example, by flexible rolling of strip material and subsequent machining of sheet blanks (tailor rolled blanks) or by joining several partial blanks of different sheet thickness (tailor welded blanks). This design allows the thickness to be adapted to the respective load conditions of the different component regions, so that a weight-optimized component is achieved overall.

According to a possible embodiment, the flange portions of the outer panel and inner panel in the upper section of the B-pillar may be offset with respect to a center plane extending between the inner wall and outer wall towards the outer wall of the outer panel. This design with a flange offset towards the outside of the vehicle is particularly suitable for motor vehicles with frameless doors. Here the flanges offset to the outside form a sealing plane with the door window of the motor vehicle. Alternatively or in addition, the flange portions of the inner panel and outer panel in the lower pillar section may be offset with respect to the center plane in the direction towards the inner wall of the inner panel. Here the inwardly offset flanges form a sealing plane with the door.

BRIEF SUMMARY OF THE DRAWINGS

Preferred embodiments are explained below using the drawing figures, which show.

DESCRIPTION

Figure 1:
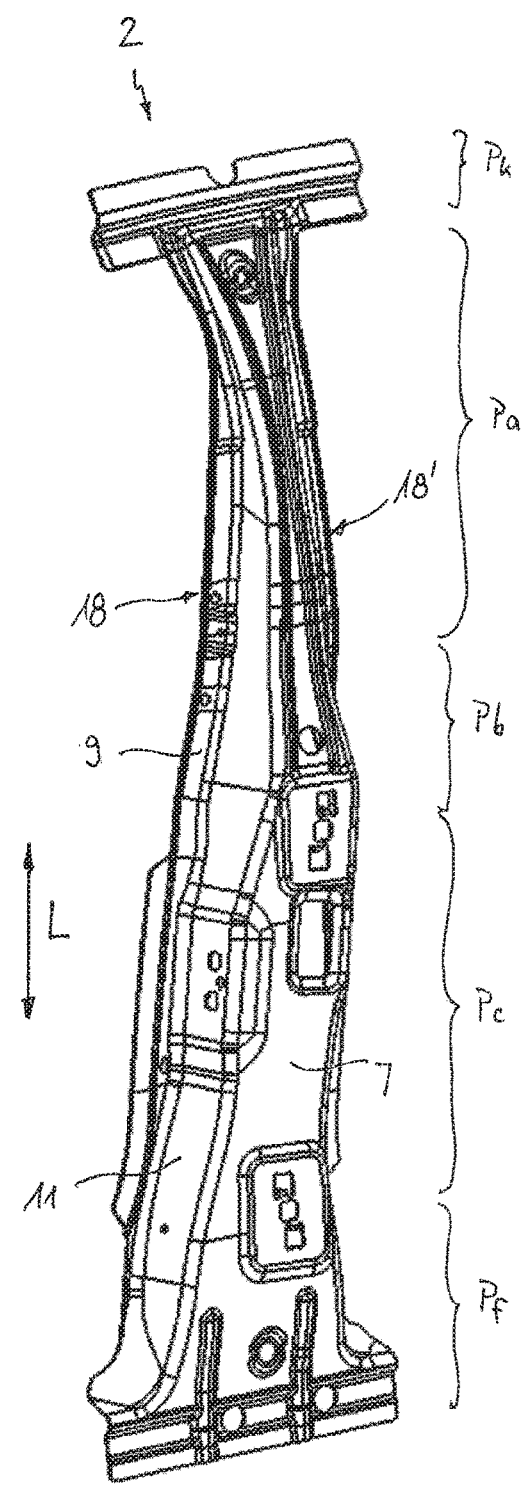
FIG. 1: A structural component in the form of a B-pillar in a three-dimensional view from the front.
Figure 2:
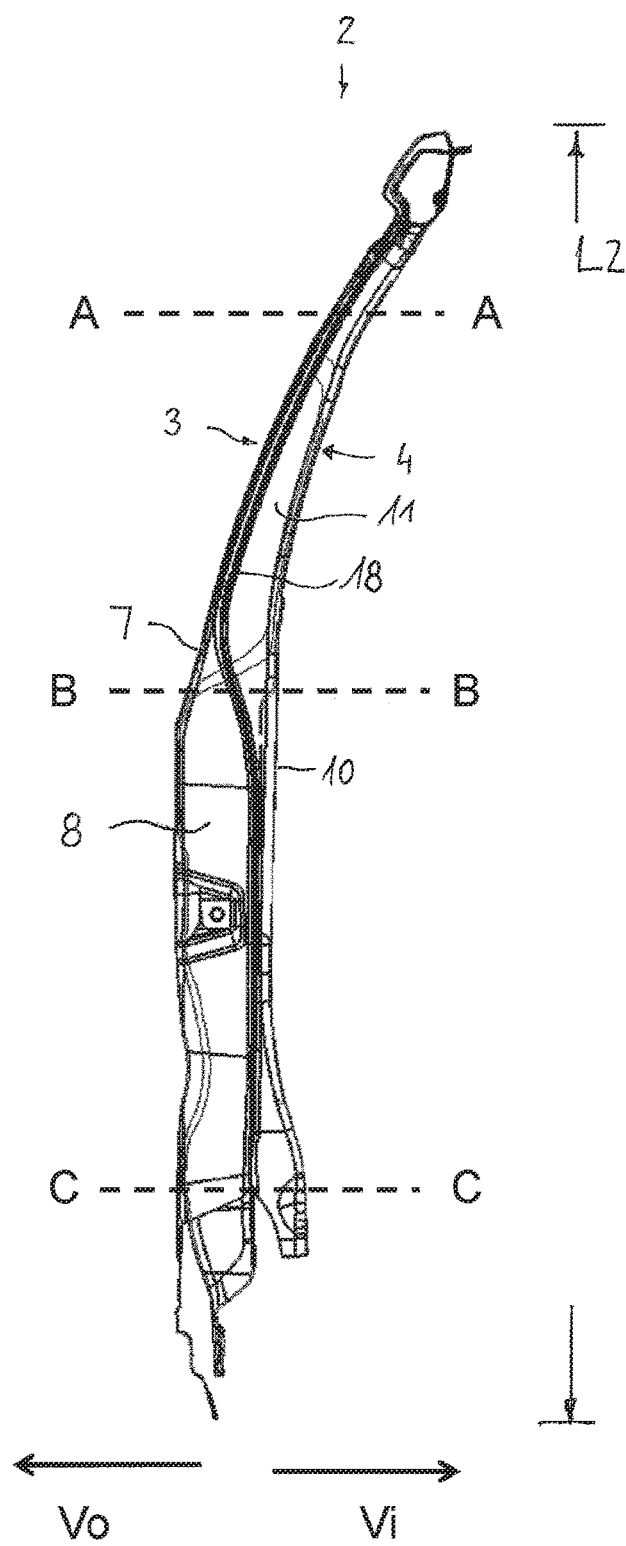
FIG. 2: a side view of the B-pillar from FIG. 1 from behind.

FIGS. 1 to 3, which are described together below, show a structural component 2 in the form of a B-pillar 2, wherein it is understood that the structural component can also have other configurations. In the context of this disclosure, structural components are in particular understood to be structural formed parts for motor vehicle body components, for example A-, B- or C-pillars, door impact beams, struts or bumpers.

A B-pillar is a supporting pillar in the middle of the passenger compartment that connects the roof area of the vehicle with the body underframe. In the event of an accident, the vehicle pillars have the task of stabilising the passenger compartment against deformation. A particularly important task of vehicle pillars is to absorb forces in the event of a side impact so that the vehicle occupants remain unharmed.

The present structural component 2 in the form of a B-pillar comprises an outer panel 3 which, in the assembled state, faces the vehicle outside Vo, an inner panel 4 which, in the assembled state, faces the vehicle inside Vi, and at least one reinforcing profile 5 which is arranged in a cavity 6 formed between the outer panel 3 and the inner panel 4 and serves to reinforce the structural component. The B-pillar further comprises a head section Pk for attaching the B-pillar to a roof spar, an upper pillar section Pa extending downwards from the head section Pk, a central pillar section Pb, an adjoining lower pillar section Pc extending downwards, and an adjoining foot section Pf adapted for attaching the B-pillar to a sill.

Figure 3A:
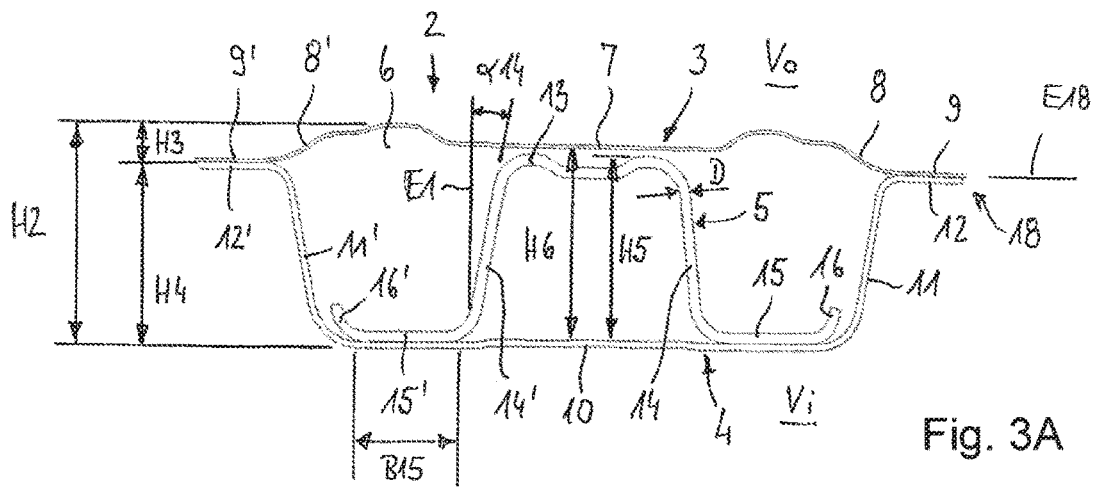
FIG. 3A: a cross-section of the B-pillar according to FIG. 1 along the section line A-A of FIG. 2.
Figure 3B:
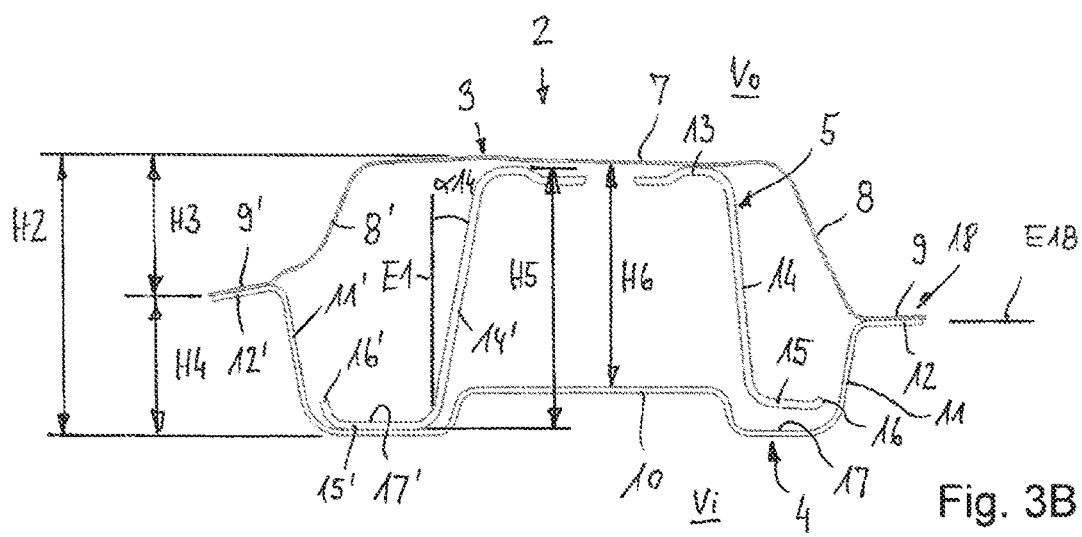
FIG. 3B: a cross-section of the B-pillar according to FIG. 1 along the section line B-B of FIG. 2.
Figure 3C:
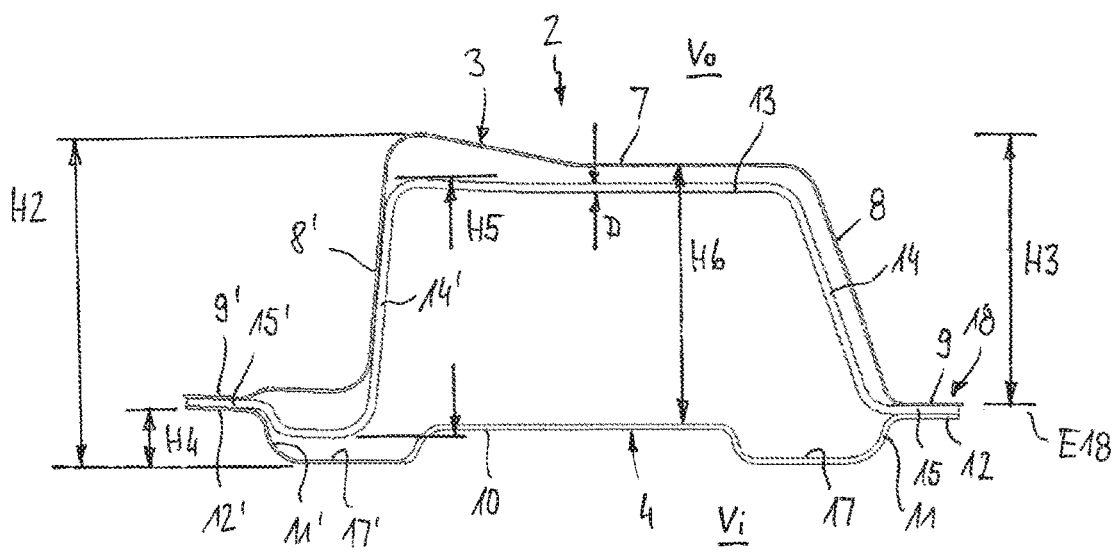
FIG. 3C: a cross-section of the B-pillar according to FIG. 1 along the section line C-C of FIG. 2.

The outer panel 3, which can also be referred to as the outer formed part, comprises an outer wall 7, two side walls 8, 8' opposing each other and two flange portions 9, 9' projecting laterally therefrom. The outer panel 3 thus has a cross-section that is essentially hat-shaped. The shape of the outer panel 3 changes over the longitudinal extension (L). The outer panel 3 is flattened in an upper area and has a low profile height H3, as can be seen in FIG. 3A in particular. The outer wall 7 is only slightly offset from the flange portions 9, 9' to the outside, and the side walls 8, 8' accordingly have only a small inclination and are relatively short. Towards the bottom, i.e., towards the foot of the pillar, the profile height H3 of the outer panel 3 increases, as shown in FIGS. 3B and 3C. In a central pillar section Pm, as shown in FIG. 3B, the flange portions 9, 9' are clearly offset from the outer wall 7 and are approximately in the middle with respect to the overall profile height H2 of the B-pillar 2. The side walls 8, 8' have a larger gradient in this middle section Pb than in the upper pillar section Pa. In the lower pillar section Pc, the profile height H3 of the outer panel 3 has increased again. The flange portions 9, 9' are at a maximum distance from the outer wall 7 and, with respect to the overall profile height H2 of the B-pillar, are arranged approximately in one level with the inner panel 4, which is flattened in this lower pillar section Pc.

The inner panel 4, which can also be referred to as the inner formed part, comprises an inner wall 10, two side walls 11, 11' opposing each other and two flange portions 12, 12' projecting laterally from them. Thus, the inner panel 4 also has an essentially hat-shaped cross-section. The cross-section of the inner panel 4 changes correspondingly opposite to the outer panel 3 in that, with increasing profile height H3 of the outer panel 3, the profile height H4 of the inner panel 4 decreases accordingly, and vice versa.

The reinforcement profile 5 comprises a profile base 13, two profile walls 14, 14' opposing each other, and two profile flanges 15, 15' projecting therefrom. The reinforcing profile 5 thus also has a cross-section that is essentially hat-shaped. The reinforcing profile 5 serves to reinforce the B-pillar 2, for which reason it has a greater wall thickness than the outer panel 3 and the inner panel 4. The reinforcing profile 5 has a maximum profile height H5, which at least in the upper pillar area Pa is greater than the maximum profile height H3 of the outer panel 3 in this pillar area Pa. In particular, it is intended that the maximum profile height H5 of the reinforcing profile 5 be greater than 0.9 times the smallest distance H6 between the outer wall 7 and the inner wall 10. A gap is formed between the profile base 13 and the outer wall 7 over the entire extension of the B-pillar. The relatively large profile height H5 results in a particularly high bending stiffness of the B-pillar 2, which depends on the effective profile height H5 of the reinforcing profile 5.

Preferably the profile height H5 of the reinforcing profile 5 is greater than the profile height H3 of the outer panel 3 for at least 30% of the total length L2 of the B-pillar 2. For a particularly high bending stiffness also in the other pillar areas, the profile height H5 of the reinforcing profile 5 can also be greater than the maximum profile height H3 of the outer panel 3 in other areas of the B-pillar. In the present case, the profile height H5 is at least in the head section Pk, and/or in the middle pillar section Pb, and/or in parts of the lower pillar section Pc, greater than the maximum profile height H3 of the outer panel 3 in the respective pillar section.

The reinforcing profile 5 is supported at least in the upper pillar section Pa with its profile flanges 15, 15' against the inner wall 10 of the inner formed part 4, as can be seen in particular in FIGS. 3A and 3B. In these sections of the B-pillar 2, in which the profile flanges 15, 15' of the reinforcing profile 5 are completely arranged in the cavity 6, the flange portions 9, 9' of the outer panel and the flange portions 12, 12' are directly in contact with one another, and/or connected to one another, and form a 2-layer flange 18, 18' of the B-pillar 2 correspondingly on both sides of the B-pillar 2.

The profile flanges 15, 15' serve in particular for connecting, respectively supporting the reinforcing profile 5 on the inner panel 4 and—in the lower pillar section Pc—also with the outer panel 3. They can therefore also be referred to as connecting or supporting portions 15, 15'. In the head section Pk of the B-pillar 2, the profile flanges 15, 15' are fixed to the inner wall 10 of the inner panel 4, for example by welding, especially resistance spot or laser welding, or by gluing. The B-pillar 2 thus comprises four connecting lines along the main extension of the pillar, namely two connecting lines along the flanges 18, 18' and two further connecting lines between the profile flanges 15, 15' and the inner base 10. The profile flanges 15, 15' preferably have a width of less than 20 mm, e.g., less than 16 mm. The edges 16, 16', and/or lateral ends of the profile flanges 15, 15' are arranged adjacent to the side walls 11, 11' of the inner panel 4 and run parallel thereto. In the pillar sections in which the profile flanges 15, 15' are supported against the inner wall 10, i.e., lie within the cavity 6, the lateral ends 16, 16' are bent upwards and thus follow the curvature of the wall 11, 11' of the inner panel 4.

The side walls 14, 14' of the reinforcement profile 5 are relatively steep in relation to the flange portions 15, 15' and the inner wall 10, respectively. In particular it is provided that in at least one pillar section Pk, Pa, Pb, Pc, Pf at least one of the profile walls 14, 14' encloses an angle $\alpha 14$ with a plane E1 perpendicular to the inner base 10 which angle is smaller than 10°, e.g., smaller than 5°, optionally smaller than 2°. This measure contributes to the largest possible width of the reinforcing profile 5, which can absorb correspondingly high compressive forces.

In the course from the upper pillar section Pa to the lower pillar section Pc, the cross-section of the reinforcing profile 5 and its connection to the inner panel 4 changes. While the profile flanges 15, 15' of the reinforcing profile 5 in the upper pillar section Pa are supported on the inner wall 10 and are completely accommodated in the cavity 6, the profile flanges 15, 15' in the lower pillar section Pc extend out of the cavity formed between the inner panel 4 and the outer panel 3 and are arranged between the flange portions 9, 9' of the outer panel 3 and the flange portions 12, 12' of the inner panel 4. Accordingly, the B-pillar in this lower pillar section Pc has a three-layer flange 18, 18', which serves in particular as a door flange. The three flange layers 9, 15, 12; 9', 15', 12' are joined together in particular by means of welding, for example resistance spot welding or high-energy beam welding. The three-layer flange 18, 18' serves as a door flange when the vehicle body is mounted, on which a door seal can be mounted.

Between the upper pillar section Pa and the lower pillar section Pc, the reinforcing profile 5 undergoes a change in shape such that the width of the reinforcing profile 5 increases and the profile flanges 15, 15' move from the inner base 10 in the direction of the flange portions 9, 9'; 12, 12'. This transition takes place approximately in the middle pillar section Pb. FIG. 3B, for example, shows that the right profile flange 15 has already been lifted off the inner base 10.

In the present embodiment of the B-pillar 2, which is particularly suitable for a motor vehicle with frameless doors, the change in the reinforcement profile 5 over the length is accompanied by a displacement of the flange plane E18 of the flanges 18, 18' of the B-pillar 2. As can be seen in particular in FIG. 2, the flanges 18, 18' are offset outwards in the upper pillar section Pa and here form a sealing plane for a door window. In the lower pillar section Pc, the flanges 18, 18' are offset inwardly and form a door flange. In the middle pillar section Pb, which can also be called the transition section, the flange plane moves from the outside to the inside.

The inner base 10 has two lateral recesses 17, 17', which run along the side walls 11, 11' over at least a partial extension of the B-pillar 2, and/or merge into same with a radius. The recesses 17, 17', which can also be called channels, extend from the middle pillar section Pb (FIG. 3B) downwards to the lower pillar section Pc (FIG. 3C). In these pillar sections with recesses 17, 17', the profile flanges 15, 15' are arranged in the recesses, respectively in the area of the recesses. At least one of the two recesses 17, 17' can be formed continuously from the head section Pk to the foot section Pf, and in particular serve as an expansion joint. The recess can optionally be designed such that this area is not hardened.

The outer panel 3 and the inner panel 4 are preferably made of steel sheet by cold forming. The steel sheet can be provided with a corrosion protection coating, e.g., a zinc coating. The reinforcement profile 5 is preferably a hot formed and hardened component made of a hardenable steel material, such as 22MnB5. The reinforcing profile 5 can be coated, e.g., with an aluminium-silicon alloy or zinc, to avoid scaling of the component during hot forming and to serve as corrosion protection, respectively.

The reinforcing profile 5 may have a variable thickness D over the length L. This allows the thickness D to be adapted to the respective technical requirements with regard to load capacity in the different component sections Pk, Pa, Pb, Pc, Pf, which contributes to a weight reduction of the B-pillar 2. The same applies to the inner panel 4, which can also have a variable thickness over its length.

LIST OF REFERENCE NUMBERS 1
2 structural component 3 outer panel
4 inner panel
5 reinforcing profile
6 cavity
7 outer wall
8, 8' sidewall
9, 9' flange portion
10 inner wall
11, 11' sidewall
12, 12' flange portion
13, 13' profile base
14, 14' profile wall
15, 15' profile flange
16, 16' edge
17, 17' recess
18, 18' flange
B width
H profile height
L length
Pk head section
Pa upper pillar section
Pb middle pillar section
Pc lower pillar section
Pf foot section
Vi inner side
Vo outer side

The invention claimed is:

1. A structural component for a motor vehicle body, comprising:
an outer panel with an outer wall, two side walls opposing each other, and two outer flange portions projecting laterally therefrom;
an inner panel with an inner wall, two side walls opposing each other, and two inner flange portions projecting laterally therefrom;
a reinforcing profile with a profile base, two profile walls opposing each other and two connecting portions connected thereto;
wherein, at least in an upper section of the structural component, a maximum profile height of the reinforcing profile is greater than a maximum profile height of the outer panel, and the connecting portions of the reinforcing profile are supported against the inner wall of the inner panel, and the two outer flange portions of the outer panel and the two inner flange portions of the inner panel abut directly against one another and are fixed to one another;
wherein the two connecting portions of the reinforcing profile, at least in a lower section of the structural component, are each arranged between and connected with (a) one of the outer flange portions of the outer panel, and (b) one of the two inner flange portions of the inner panel, respectively.

2. The structural component of claim 1, wherein the connecting portions in a head section of the structural component, which is configured to be connected to a roof rail of the motor vehicle, are fixed to the inner wall of the inner panel.

3. The structural component of claim 1, wherein the upper section of the structural component, in which the maximum profile height of the reinforcing profile is greater than the maximum profile height of the outer panel, is at least 0.3 times a total length of the structural component.

4. The structural component of claim 1, wherein the maximum profile height of the reinforcing profile, at least in the upper section of the structural component, is greater than 0.9 times the smallest distance between the outer wall and the inner wall.

5. The structural component of claim 1, wherein the connecting portions bear flat against the inner wall of the inner panel at least in the upper section.

6. The structural component of claim 1, wherein at least in a partial region of the upper section of the structural component the connecting portions of the reinforcing profile are fixed to the inner wall of the inner panel.

7. The structural component of claim 1, wherein at least in a partial region of the upper section of the structural component the connecting portions of the reinforcing profile are supported on the inner wall of the inner panel without a material-locking connection or form-locking connection.

8. The structural component of claim 1, wherein the connecting portions, at least in the section in which they are supported against the inner wall, have a width of less than 20 millimeters.

9. Structural component according claim 1, wherein at least one of the side walls of the reinforcing profile encloses an angle with a plane perpendicular to the profile base, which angle in at least one cross-section through the B-pillar is smaller than 5°.

10. The structural component of claim 1, wherein, at least in a cross-section in the upper section of the structural component, an average width between the profile walls of the reinforcing profile is at least one of greater than 0.3 times and smaller than 0.7 times an average width between the side walls of the inner panel.

11. The structural component of claim 1, wherein the inner wall of the inner panel has, at least in a middle section of the structural component, two lateral recesses which are arranged adjacent to the inner side walls and extend parallel thereto, wherein at least one of the connecting portions of the reinforcing profile is supported in one of the lateral recesses.

12. The structural component of claim 1, wherein the connecting portions of the reinforcing profile, at least in a lower section of the structural component, are fixed between the outer flange portions of the outer panel and the inner flange portions of the inner panel.

13. The structural component of claim 1, wherein the lower section of the structural component, in which the connecting portions of the reinforcing profile are connected to the outer flange portions of the outer panel and the inner flange portions of the inner panel, is less than 0.5 times a total length of the structural component.

14. The structural component of claim 1, wherein at least one of the inner panel and the outer panel is cold-formed, and wherein the reinforcing profile is hot-formed and hardened.

15. The structural component of claim 1, wherein at least one of the inner panel and the reinforcing profile has a variable thickness over a length.

16. The structural component of claim 1, wherein, in the upper section of the structural component, the outer flange portions and the inner flange portions are offset in direction towards the outer wall of the outer panel with respect to a central plane extending between the inner wall and the outer wall, and, wherein, in the lower section of the structural component, the outer flange portions of the outer panel and the inner flange portions of the inner panel are offset in direction towards the inner wall of the inner panel with respect to the central plane.

17. A structural component for a motor vehicle body, comprising:
- an outer panel with an outer wall, two side walls opposing each other, and two outer flange portions projecting laterally therefrom;
- an inner panel with an inner wall, two side walls opposing each other, and two inner flange portions projecting laterally therefrom;
- a reinforcing profile with a profile base, two profile walls opposing each other and two connecting portions connected thereto;
- wherein, at least in an upper section of the structural component, a maximum profile height of the reinforcing profile is greater than a maximum profile height of the outer panel, and the connecting portions of the reinforcing profile are supported against the inner wall of the inner panel, and the outer flange portions and the inner flange portions abut directly against one another and are fixed to one another;
- wherein the connecting portions of the reinforcing profile, at least in a lower section of the structural component, are fixed between the outer flange portions of the outer panel and the inner flange portions of the inner panel,
- wherein, in the upper section of the structural component, the outer flange portions and the inner flange portions are offset in direction towards the outer wall of the outer panel with respect to a central plane extending between the inner wall and the outer wall, and,
- wherein, in the lower section of the structural component, the outer flange portions of the outer panel and the inner flange portions of the inner panel are offset in direction towards the inner wall of the inner panel with respect to the central plane.

* * * * *

UNITED STATES PATENT AND TRADEMARK OFFICE
CERTIFICATE OF CORRECTION

PATENT NO. : 11,021,191 B2  
APPLICATION NO. : 16/334083  
DATED : June 1, 2021  
INVENTOR(S) : Johannes Walch, Michael Stein and Hubertus Steffens Page 1 of 1

It is certified that error appears in the above-identified patent and that said Letters Patent is hereby corrected as shown below:

On the Title Page

In the Abstract:
Item (57), in Lines 10-12, replace "inner wall, and wherein the connecting portions of the reinforcing profile are supported against the inner wall, and wherein the outer flange portions" with -- inner wall, and wherein the outer flange portions --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*